US012659501B2

(12) United States Patent
Gelardi et al.

(10) Patent No.: US 12,659,501 B2
(45) Date of Patent: Jun. 16, 2026

(54) DEVICES AND METHODS FOR DIGITAL WATERMARKING

(71) Applicant: HUAWEI TECHNOLOGIES CO., LTD., Shenzhen (CN)

(72) Inventors: Gabriele Gelardi, Munich (DE); Theo Dimitrakos, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/010,839

(22) Filed: Jan. 6, 2025

(65) Prior Publication Data

US 2025/0142105 A1 May 1, 2025

Related U.S. Application Data

(63) Continuation of application No. PCT/EP2022/068816, filed on Jul. 7, 2022.

(51) Int. Cl.
*H04N 19/467* (2014.01)
*G06T 3/40* (2024.01)
*G06T 5/20* (2006.01)

(52) U.S. Cl.
CPC ............. *H04N 19/467* (2014.11); *G06T 3/40* (2013.01); *G06T 5/20* (2013.01)

(58) Field of Classification Search
None
See application file for complete search history.

(56) References Cited

U.S. PATENT DOCUMENTS

| | | | | |
|---|---|---|---|---|
| 8,467,445 B2 * | 6/2013 | Celik | ................... | H04N 19/467 |
| | | | | 375/240.01 |
| 2009/0290750 A1 * | 11/2009 | Tapson | ............. | H04N 21/23892 |
| | | | | 382/100 |
| 2013/0170695 A1 | 7/2013 | Anan et al. | | |
| 2020/0221112 A1 | 7/2020 | Braudaway et al. | | |
| 2022/0197306 A1 * | 6/2022 | Cella | ................... | G05D 1/0297 |
| 2023/0419446 A1 * | 12/2023 | Illgner | ................. | G06T 3/4046 |

FOREIGN PATENT DOCUMENTS

JP            2016122984 A        7/2016

* cited by examiner

*Primary Examiner* — Edemio Navas, Jr.
(74) *Attorney, Agent, or Firm* — Leydig, Voit & Mayer, Ltd.

(57) ABSTRACT

An apparatus for embedding a message bit sequence in a video stream is disclosed. The apparatus is configured to determine one or more transformation frames of the at least one frame of the plurality of frames of the video stream based on a wavelet kernel filter. Moreover, the apparatus is configured to encode the message bit sequence by performing for each bit of the message bit sequence a pointwise multiplication of absolute values of elements of subframes of the one or more transformation frames, depending on a value of the respective message bit of the message bit sequence, with the elements of a first encoding matrix or the elements of a second encoding matrix for obtaining one or more modified transformation frames. The apparatus is configured to add the one or more modified transformation to the at least one frame of the plurality of frames of the video stream.

19 Claims, 5 Drawing Sheets

301b

1:8

103

103a      103b      103c      103d

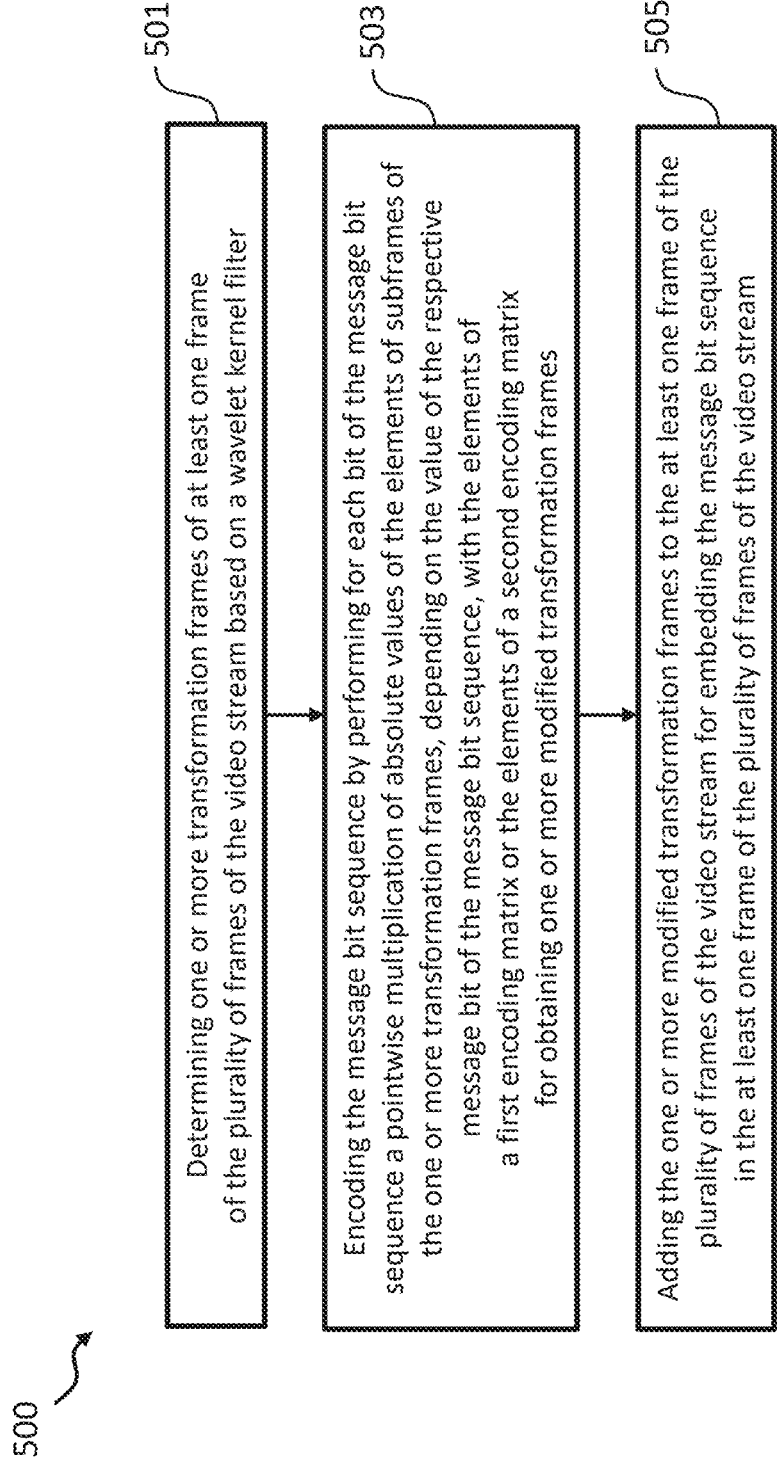

501

Determining one or more transformation frames of at least one frame of the plurality of frames of the video stream based on a wavelet kernel filter

503

Encoding the message bit sequence by performing for each bit of the message bit sequence a pointwise multiplication of absolute values of the elements of subframes of the one or more transformation frames, depending on the value of the respective message bit of the message bit sequence, with the elements of a first encoding matrix or the elements of a second encoding matrix for obtaining one or more modified transformation frames

505

Adding the one or more modified transformation frames to the at least one frame of the plurality of frames of the video stream for embedding the message bit sequence in the at least one frame of the plurality of frames of the video stream

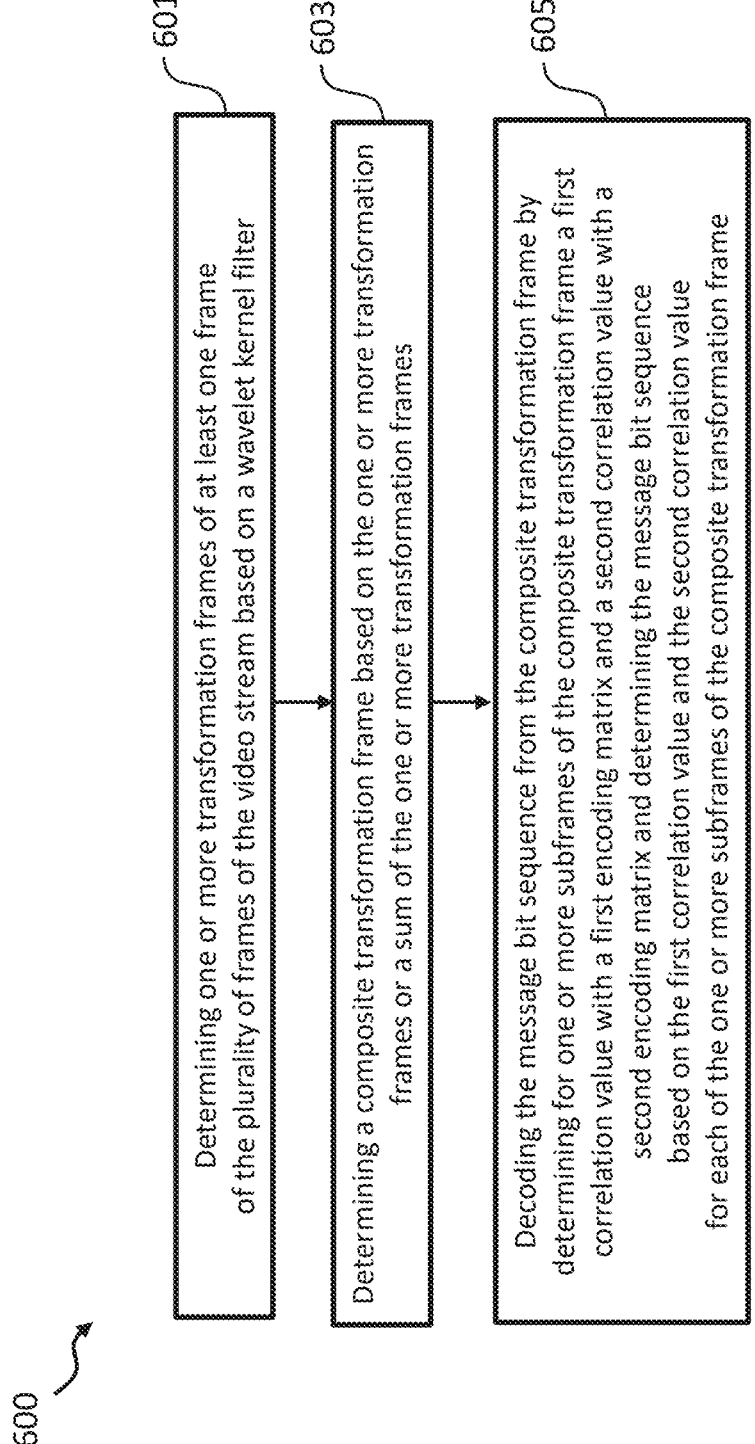

601

Determining one or more transformation frames of at least one frame of the plurality of frames of the video stream based on a wavelet kernel filter

603

Determining a composite transformation frame based on the one or more transformation frames or a sum of the one or more transformation frames

605

Decoding the message bit sequence from the composite transformation frame by determining for one or more subframes of the composite transformation frame a first correlation value with a first encoding matrix and a second correlation value with a second encoding matrix and determining the message bit sequence based on the first correlation value and the second correlation value for each of the one or more subframes of the composite transformation frame

DEVICES AND METHODS FOR DIGITAL WATERMARKING

CROSS-REFERENCE TO RELATED APPLICATIONS

This application is a continuation of International Application No. PCT/EP2022/068816, filed on Jul. 7, 2022, the disclosure of which is hereby incorporated by reference in its entirety.

FIELD

The present invention relates to data processing. More specifically, the present invention relates to devices and methods for digital watermarking of a video stream.

BACKGROUND

With the increase in the use and distribution of digital multimedia data, content protection becomes increasingly important to avoid unrestricted duplication and dissemination of copyrighted materials. Digital watermark technology has emerged as a method complementary to encryption for content protection of copyrighted materials. Digital watermarking techniques embed a secret imperceptible signal, a watermark, into the original content. It usually remains present with the original content and survives transformation, conversion and transcoding.

In a camcording attack a video stream displayed on a display is re-recorded using a camera. During this process the re-recorded video stream may experience substantial alterations of different kinds, leaving however the video stream to a decent quality in order to appreciate its content. An example of this kind of attack can be found in cinema rooms, where malicious users record the projected movie using a camera, for instance, a smartphone camera.

The main means of deterring this attack is by embedding an imperceptible watermark in the video content that survives rerecording and contains information that allows identification of a possible point of leak. Although there are already few known techniques attempting to counter this attack, the main problem remains essentially unsolved since existing techniques suffer from weak robustness and survivability and require precise external conditions to work. In addition to that, the computational power and delay per frame necessary in order to embed the watermark makes these existing techniques impractical for use in live streaming scenarios where (near) real time embedding of a watermark is an essential feature and the full content of the video is not known at the beginning of the embedding process. Moreover, the re-recording process may introduce new challenges related to frame realignment. Most of the conventional watermarking techniques require the video to be realigned to its original shape. This procedure in most of the cases is not automated and requires human intervention in order to select the four corners of the display.

SUMMARY

In accordance with an embodiment, the present disclosure provides improved devices and methods for digital watermarking.

More specifically, a data processing apparatus (also referred to as encoding apparatus) for embedding, e.g., encoding a message bit sequence, e.g., a digital watermark in a video stream comprising a plurality of frames is provided. The data processing apparatus comprises a processing circuitry configured to modify at least one frame of the plurality of frames of the video stream by:

determining one or more transformation frames of the at least one frame of the plurality of frames of the video stream based on a wavelet kernel filter;

encoding the message bit sequence by performing for each bit of the message bit sequence a pointwise multiplication (also known as elementwise multiplication, e.g., element by element) of absolute values of the elements of subframes of the one or more transformation frames, depending on the value of the respective message bit of the message bit sequence, with the elements of a first encoding matrix (also referred to as first encoding pattern) or the elements of a second encoding matrix (also referred to as second encoding pattern) for obtaining one or more modified transformation frames; and adding the one or more modified transformation frames to the at least one original frame for embedding the message bit sequence in the at least one frame of the video stream. Thus, an improved encoding apparatus for embedding a digital watermark in a video stream is provided.

In a further possible implementation form, the processing circuitry is configured to determine the one or more transformation frames of the at least one frame based on the wavelet kernel filter by performing a convolution of the wavelet kernel filter along one or more directions of the at least one original frame. The wavelet kernel filter may be defined by a one-dimensional array of filter coefficients.

In a further possible implementation form, the processing circuitry is configured to determine the one or more transformation frames by a convolution of the wavelet kernel filter along a horizontal direction of the at least one frame, a convolution of the wavelet kernel filter along a vertical direction of the at least one frame and/or a convolution of the wavelet kernel filter along a diagonal direction of the at least one frame.

In a further possible implementation form, the video stream comprises a YUV video stream and the at least one original frame of the plurality of frames of the YUV video stream is a Y frame (also referred to as Y channel).

In a further possible implementation form, the processing circuitry is further configured to downscale the at least one frame of the plurality of frames for obtaining a downscaled version of the at least one frame and to modify the downscaled version of the at least one frame of the plurality of frames of the video stream.

In a further possible implementation form, the processing circuitry is configured to downscale the at least one frame of the plurality of frames for obtaining a downscaled version of the at least one frame by a factor of 2 or more.

In a further possible implementation form, the processing circuitry is further configured to upscale a respective downscaled version of the one or more modified transformation frames for adding the respective modified transformation frame to the at least one frame for embedding the message bit sequence in the at least one frame of the video stream.

In a further possible implementation form, the elements of the first encoding matrix, e.g., encoding pattern have the values +1 or −1 and the second encoding matrix, e.g., encoding pattern is the result of a pointwise multiplication of the elements of the first encoding matrix with −1.

In a further possible implementation form, the processing circuitry is configured to generate the first encoding matrix and/or the second encoding matrix based on a random number generator.

In a further possible implementation form, the processing circuitry is configured to generate the first encoding matrix and/or the second encoding matrix to have a desired spatial frequency distribution and/or a desired degree of orthogonality.

In a further possible implementation form, the processing circuitry is further configured to multiply at least some of the elements of the one or more modified transformation frames with a scaling factor smaller than 1, before adding the one or more modified transformation frames to the at least one original frame for embedding the message bit sequence in the at least one original frame of the video stream.

According to a second aspect a method for embedding a message bit sequence, e.g., a digital watermark in a video stream comprising a plurality of frames is disclosed. The method comprises the steps of:

determining one or more transformation frames of at least one original frame of the plurality of frames of the video stream based on a wavelet kernel filter;

encoding the message bit sequence by performing for each bit of the message bit sequence a pointwise multiplication of absolute values of the elements of subframes of the one or more transformation frames, depending on the value of the respective message bit of the message bit sequence, with the elements of a first encoding matrix or the elements of a second encoding matrix for obtaining one or more modified transformation frames; and adding the one or more modified transformation frames to the at least one original frame for embedding the message bit sequence in the at least one original frame of the video stream.

The encoding method according to the second aspect can be performed by the encoding apparatus according to the first aspect. Thus, further features of the encoding method according to the second aspect result directly from the functionality of the encoding apparatus according to the first aspect and its different implementation forms described above and below.

According to a third aspect a data processing apparatus for decoding, e.g., retrieving a message bit sequence, e.g., a digital watermark from a video stream comprising a plurality of frames is disclosed. The data processing apparatus comprises a processing circuitry configured to decode the message bit sequence from at least one frame of the plurality of frames of the video stream by:

determining one or more transformation frames of the at least one frame of the plurality of frames of the video stream based on a wavelet kernel filter;

determining a composite transformation frame based on the one or more transformation frames or a sum of the one or more transformation frames; and decoding the message bit sequence from the composite transformation frame by determining for one or more subframes of the composite transformation frame a first correlation value with a first encoding matrix and a second correlation value with a second encoding matrix and determining the message bit sequence based on the first correlation value and the second correlation value for each of the one or more subframes of the composite transformation frame. Thus, an improved decoding apparatus for extracting a digital watermark from a video stream is provided.

In a further possible implementation form, the processing circuitry is configured to determine the one or more transformation frames of the at least one frame based on the wavelet kernel by performing a convolution of the wavelet kernel along one or more directions of the at least one frame.

In a further possible implementation form, the processing circuitry is configured to determine the one or more transformation frames by a convolution of the wavelet kernel filter along a horizontal direction of the at least one frame, a convolution of the wavelet kernel filter along a vertical direction of the at least one frame and/or a convolution of the wavelet kernel filter along a diagonal direction of the at least one frame.

In a further possible implementation form, the video stream comprises a YUV video stream and the at least one frame of the plurality of frames of the YUV video stream is a Y frame.

In a further possible implementation form, the elements of the first encoding matrix, e.g., encoding pattern have the values +1 or −1 and the second encoding matrix, e.g., encoding pattern is the result of a pointwise multiplication of the elements of the first encoding matrix with −1.

In a further possible implementation form, the processing circuitry is configured to generate the first encoding matrix, e.g., encoding pattern and/or the second encoding matrix, e.g., encoding pattern or to receive the first encoding matrix, e.g., decoding pattern and/or the second encoding matrix, e.g., decoding pattern from an encoding apparatus for encoding the message bit sequence in the video stream.

In a further possible implementation form, the processing circuitry is configured to generate the first encoding matrix, e.g., the first decoding pattern and/or the second encoding matrix, e.g., decoding pattern to have a desired spatial frequency distribution and/or a desired degree of orthogonality.

According to a fourth aspect a data processing method for decoding, e.g., retrieving a message bit sequence, e.g., a digital watermark from a video stream comprising a plurality of frames is disclosed. The data processing method comprises the steps of:

determining one or more transformation frames of at least one frame of the plurality of frames of the video stream based on a wavelet kernel filter;

determining a composite transformation frame based on the one or more transformation frames or a sum of the one or more transformation frames; and decoding the message bit sequence from the composite transformation frame by determining for one or more subframes of the composite transformation frame a first correlation value with a first encoding matrix and a second correlation value with a second encoding matrix and determining the message bit sequence based on the first correlation value and the second correlation value for each of the one or more subframes of the composite transformation frame.

The decoding method according to the fourth aspect can be performed by the decoding apparatus according to the third aspect. Thus, further features of the decoding method according to the fourth aspect result directly from the functionality of the decoding apparatus according to the third aspect and its different implementation forms described above and below.

According to a fifth aspect a computer program or a computer program product is provided, comprising a computer-readable storage medium carrying program code which causes a computer or a processor to perform the method according to the second aspect or the method according to the fourth aspect when the program code is executed by the computer or the processor.

The different aspects of the invention can be implemented in software and/or hardware.

BRIEF DESCRIPTION OF THE DRAWINGS

In the following embodiments of the invention are described in more detail with reference to the attached figures and drawings, in which:

FIG. 5 is a flow diagram illustrating a computer-implemented method according to an embodiment for encoding a message in a video stream; and FIG. 6 is a flow diagram illustrating a computer-implemented method according to an embodiment for retrieving a message from a video stream.

In the following identical reference signs refer to identical or at least functionally equivalent features.

DETAILED DESCRIPTION

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or more of the plurality of steps are not explicitly described or illustrated in the figures. Further, it is understood that the features of the various exemplary embodiments and/or aspects described herein may be combined with each other, unless specifically noted otherwise.

Figure 1:
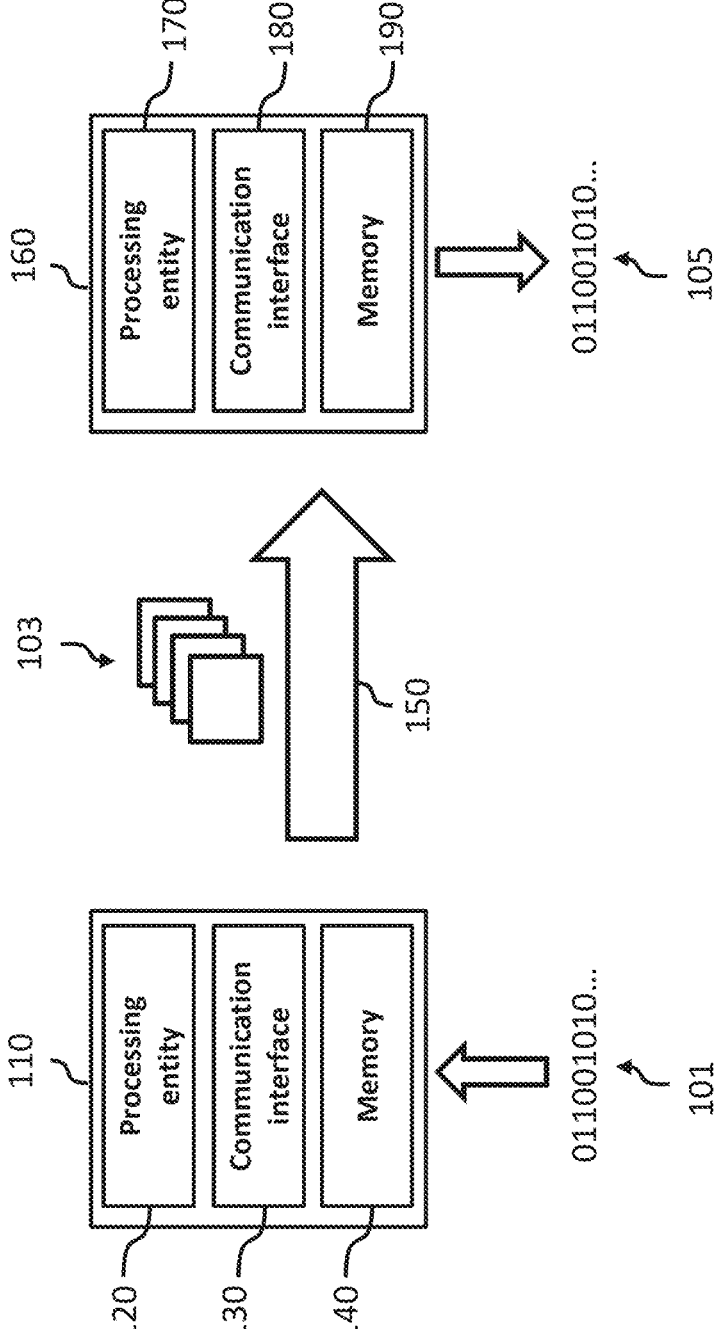
FIG. 1 is a schematic diagram illustrating an encoding apparatus according to an embodiment for encoding a message in a video stream and a decoding apparatus according to an embodiment for retrieving the message from the video stream.
Figure 2:
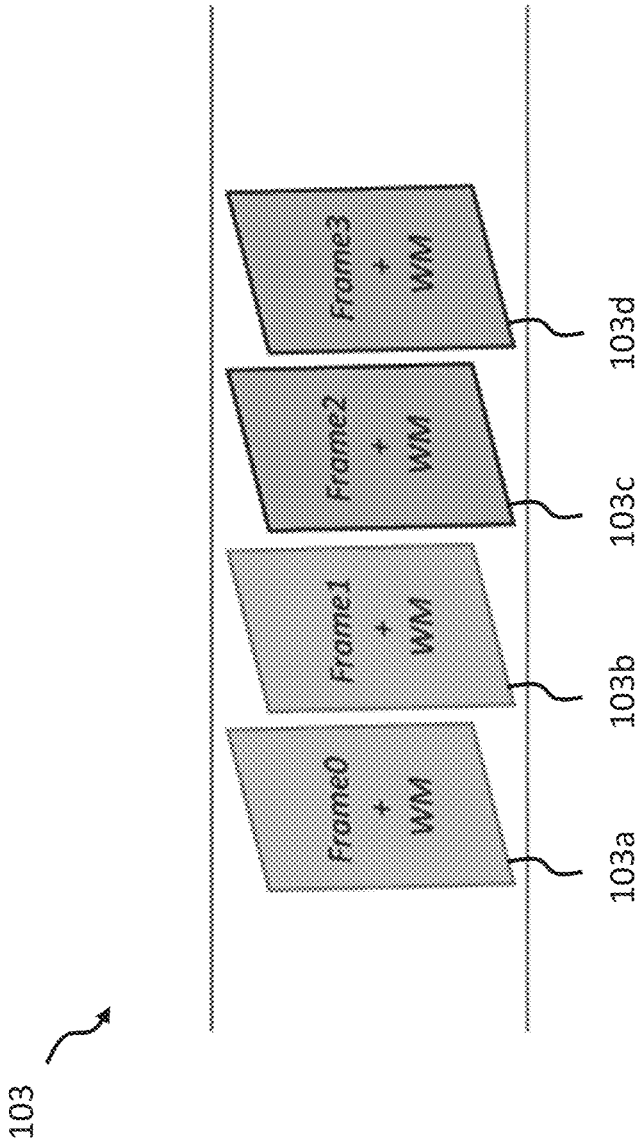
FIG. 2 is a schematic diagram illustrating frames of a video stream with an embedded digital watermark.

FIG. 1 is a schematic diagram illustrating an encoding apparatus 110 according to an embodiment for encoding a message including a plurality of message bits 101 (also referred to as digital watermark) in a video stream 103 including a plurality of video frames 103a-d (shown in FIG. 2) and a decoding apparatus 160 according to an embodiment for retrieving the message including a plurality of message bits 105, e.g., the digital watermark from the video stream 103. FIG. 2 is a schematic diagram illustrating a plurality of exemplary frames 103a-d of a video stream 103 with an embedded digital watermark. In an embodiment, the video stream 103 may be a YUV video stream 103 and the encoding apparatus may be configured to embed the plurality of message bits 101 in one or more Y frames (or channels) of the YUV video stream 103.

The encoding apparatus 110 and/or the decoding apparatus 160 may be a data processing apparatus, such as a server, a desktop computer, a laptop computer, a tablet computer or another device having the computational resources for implementing the embodiments disclosed herein.

As illustrated in FIG. 1, the encoding apparatus 110 comprises a processing circuitry 120, such as one or more processors 120 for processing data. The processing circuitry 120 of the encoding apparatus 110 may be implemented in hardware and/or software. The hardware may comprise digital circuitry, or both analog and digital circuitry. Digital circuitry may comprise components such as application-specific integrated circuits (ASICs), field-programmable arrays (FPGA), digital signal processors (DSPs), or general-purpose processors. Moreover, the encoding apparatus 110 may comprise a communication interface 130 for wired and/or wireless communication, for instance, with the decoding apparatus 160 via a communication channel 150. The encoding apparatus 110 may further comprise a memory 140) for storing and retrieving data. The memory 140 of the encoding apparatus 110 may store executable program code which, when executed by the processing circuitry 120, causes the encoding apparatus 110 to perform the functions and methods described herein.

Likewise, the decoding apparatus 160 comprises a processing circuitry 170, such as one or more processors 170 for processing data. The processing circuitry 170 of the decoding apparatus 160 may be implemented in hardware and/or software. The hardware may comprise digital circuitry, or both analog and digital circuitry. Digital circuitry may comprise components such as application-specific integrated circuits (ASICs), field-programmable arrays (FPGAs), digital signal processors (DSPs), or general-purpose processors. Moreover, the decoding apparatus 160 may comprise a communication interface 180 for wired and/or wireless communication, for instance, with the encoding apparatus 110 via the communication channel 150. The decoding apparatus 160 may further comprise a memory 190 for storing and retrieving data. The memory 190 of the decoding apparatus 160 may store executable program code which, when executed by the processing circuitry 170, causes the decoding apparatus 160 to perform the functions and methods described herein.

As will be described in more detail in the following under further reference to FIGS. 3a, 3b and 4a, 4b, for embedding the message bit sequence 101 in the video stream 103 the processing circuitry 120 of the encoding apparatus 110 is configured to modify at least one frame of the plurality of frames 103a-d of the video stream 103 in the following way.

Figure 4B:
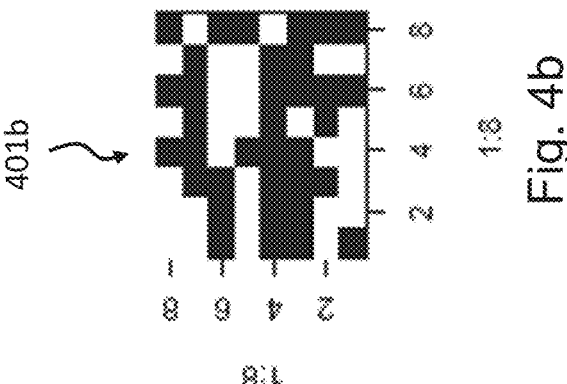
FIGS. 4a and 4b illustrate a first encoding pattern and a second encoding pattern used by an encoding apparatus according to an embodiment and a decoding apparatus according to an embodiment.
Figure 4A:
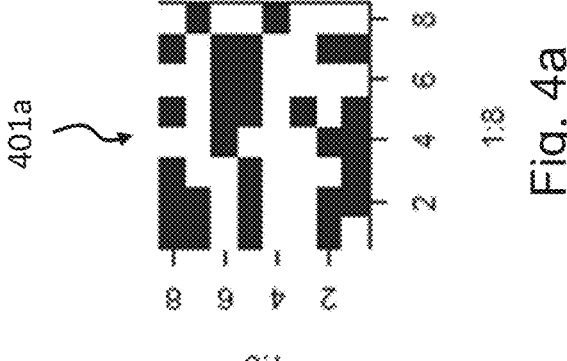
Figure 3B:
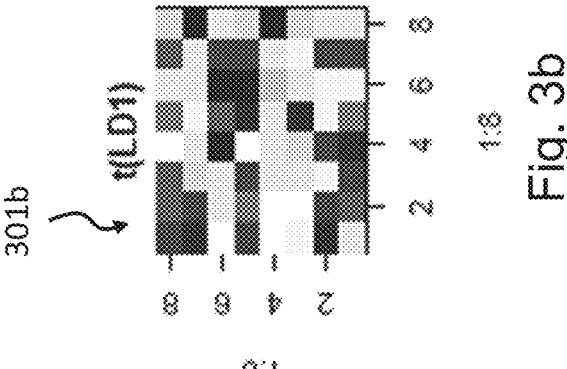
FIGS. 3a and 3b illustrate an exemplary first and second estimated encoding matrix, e.g., encoding pattern estimated for an encoding apparatus according to an embodiment and a decoding apparatus according to an embodiment.
Figure 3A:
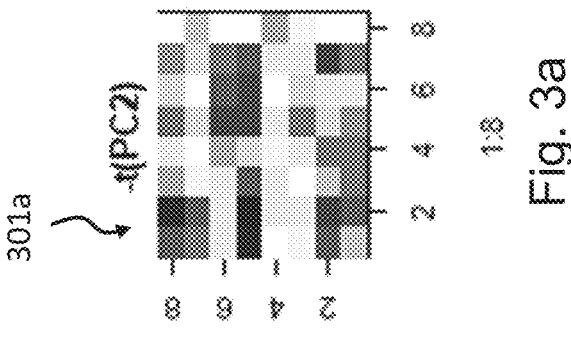

FIGS. 4a and 4b illustrate a first encoding matrix or pattern 401a and a second encoding pattern or matrix 401b used by the encoding apparatus 110 according to an embodiment and the decoding apparatus 160 according to an embodiment, while FIGS. 3a and 3b illustrate a first estimated encoding pattern 301a and a second estimated encoding pattern 301b.

In a first stage of the embedding process, the processing circuitry 120 of the encoding apparatus 110 is configured to determine one or more transformation frames of the at least one frame of the plurality of frames 103a-d of the video stream 103 based on a wavelet kernel filter. In an embodiment, the one or more transformation frames may have the same size, e.g., the same number of pixels as the at least one frame of the plurality of frames 103a-d of the video stream 103. In an embodiment, the wavelet kernel filter may be a one-dimensional kernel filter. In an embodiment, the wavelet kernel filter may be a wavelet kernel filter based on a biorthogonal wavelet.

In an embodiment, the processing circuitry 120 of the encoding apparatus 110 is configured to determine the one or more transformation frames of the at least one frame of the plurality of frames 103a-d of the video stream 103 based on the wavelet kernel filter by performing a convolution of the wavelet kernel filter along one or more directions of the at least one frame of the plurality of frames 103a-d of the video stream 103. In an embodiment, the processing circuitry 120 of the encoding apparatus is configured to determine the one or more transformation frames by a convolution of the wavelet kernel filter along a horizontal direction of the at least one frame, a convolution of the wavelet kernel filter along a vertical direction of the at least one frame and a convolution of the wavelet kernel filter along a diagonal direction of the at least one frame. As will be appreciated, in this case the one or more transformation frames would comprise three transformation frames.

In a second stage of the embedding process, the processing circuitry 120 of the encoding apparatus 110 is configured to encode the message bit sequence 101 by performing for each bit of the message bit sequence 101 a pointwise multiplication (also referred to as elementwise multiplication, e.g., element by element) of absolute values of the elements of subframes of the one or more transformation frames, depending on the value of the respective message bit of the message bit sequence 101, either with the elements of the first encoding matrix 401a (also referred to as first encoding pattern 401a) or with the elements of the second encoding matrix 401b (also referred to as second encoding pattern 401b) for obtaining one or more modified transformation frames. In an embodiment, the plurality of subframes may cover the whole respective transformation frame. In an embodiment, the size M×N of the plurality of subframes should be an integer fraction of the size of the respective transformation frame. The height M and the width N of the plurality of subframes may be chosen differently in order to maximize robustness (big height and width e.g., 8×8) or maximize embeddable space (e.g., 4×4).

As already mentioned above, an exemplary first encoding pattern 401a and an exemplary second encoding pattern 401a are illustrated in FIGS. 4a and 4b, respectively. In an embodiment, the elements of the first encoding pattern 401a have the values +1 or −1 and the second encoding pattern 401b is the result of a pointwise multiplication of the elements of the first encoding pattern 401a with −1 (reversing the sign of the values of the first encoding pattern 401a). In an embodiment, the processing circuitry 120 of the encoding apparatus 110 is configured to generate the first encoding pattern 401a and the second encoding pattern 401b based on a random number generator. In an embodiment, the processing circuitry 120 of the encoding apparatus 110 is configured to generate the first encoding pattern 401a and the second encoding pattern 401b to have a desired spatial frequency distribution and/or a desired degree of orthogonality.

In a third stage of the embedding process, the processing circuitry 120 of the encoding apparatus 110 is configured to add the one or more modified transformation frames (generated by means of the two previous stages of the embedding process described above) to the at least one frame of the plurality of frames 103a-d of the video stream 103 for embedding the message bit sequence 101 in the at least one frame of the plurality of frames 103a-d of the video stream 103. In an embodiment, the processing circuitry 120 of the encoding apparatus 110 is further configured to multiply at least some of the elements of the one or more modified transformation frames with a scaling factor smaller than 1 and larger than 0), before adding the one or more modified transformation frames to the at least one frame of the plurality of frames 103a-d of the video stream 103 for embedding the message bit sequence 101 in the at least one frame of the plurality of frames 103a-d of the video stream 103.

In an embodiment, the processing circuitry 120 of the encoding apparatus 110 may be further configured to downscale the at least one frame of the plurality of frames 103a-d of the video stream 103 for obtaining a downscaled version of the at least one frame of the plurality of frames 103a-d of the video stream 103 and to modify the downscaled version of the at least one frame of the plurality of frames 103a-d of the video stream 103, in the way described above. In an embodiment, the processing circuitry 120 of the encoding apparatus 110 is configured to downscale the at least one frame of the plurality of frames 103a-d of the video stream 103 for obtaining a downscaled version of the at least one frame of the plurality of frames 103a-d of the video stream 103 by a factor of 2 or more. In an embodiment including this kind of downscaling, the processing circuitry 120 of the encoding apparatus 110 may be further configured to upscale a downscaled version of the one or more modified transformation frames for adding the modified transformation frame to the at least one frame of the plurality of frames 103a-d of the video stream 103 for embedding the message bit sequence 101 in the at least one frame of the plurality of frames 103a-d of the video stream 103.

For decoding the digital watermark embedded by the encoding apparatus 110 in the way described above in the video stream 103 the processing circuitry 170 of the decoding apparatus 160 is configured to perform the decoding process described in the following.

In a first stage of the decoding processing the processing circuitry 170 of the decoding apparatus 160 is configured to determine one or more transformation frames of the at least one frame of the plurality of frames 103a-d of the video stream 103 based on the wavelet kernel filter already described above. As will be appreciated, the same operation is performed by the encoding apparatus 110. Thus, the one or more transformation frames may have the same size, e.g., the same number of pixels as the at least one frame of the plurality of frames 103a-d of the video stream 103. In an embodiment, the wavelet kernel filter may be a one-dimensional kernel filter.

In an embodiment, the processing circuitry 170 of the decoding apparatus 160 is configured to determine the one or more transformation frames of the at least one frame of the plurality of frames 103a-d of the video stream 103 based on the wavelet kernel filter by performing a convolution of the wavelet kernel filter along one or more directions of the at least one frame of the plurality of frames 103a-d of the video stream 103. In an embodiment, the processing circuitry 170 of the decoding apparatus 160 is configured to determine the one or more transformation frames by a convolution of the wavelet kernel filter along a horizontal direction of the at least one frame, a convolution of the wavelet kernel filter along a vertical direction of the at least one frame and a convolution of the wavelet kernel filter along a diagonal direction of the at least one frame. As will be appreciated, in this case the one or more transformation frames would comprise three transformation frames. For determining a composite transformation frame based on the one or more transformation frames the processing circuitry 170 of the decoding apparatus 160 is further configured to determine a sum of the, for instance, three transformation frames (for a single transformation frame the processing circuitry 170 of the decoding apparatus 160 may use this single transformation frame as the composite transformation frame).

In a second stage of the decoding processing the processing circuitry 170 of the decoding apparatus 160 is configured to decode, e.g., retrieve the message bit sequence 105 from the composite transformation frame by determining for one or more subframes of the composite transformation frame a first correlation value with the first encoding matrix 401a and a second correlation value with the second encoding matrix 401b and determining the message bit sequence 105 based on the first correlation value and the second correlation value for each of the one or more subframes of the composite transformation frame. As will be appreciated, for extracting the digital watermark 105 the processing circuitry 170 of the decoding apparatus 160 is configured to use the same encoding matrices or patterns 401a,b as the encoding apparatus 110 for embedding the digital watermark 101. In an embodiment, the processing circuitry 170 of the decoding apparatus may be configured to generate the first encoding matrix 401a and/or the second encoding matrix 401a itself (for instance, based on a seed value received from the encoding apparatus 110) or to receive the first encoding matrix 401a and/or the second encoding matrix 401b from the encoding apparatus 110. In other words, the processing circuitry 170 of the decoding apparatus 160 is configured to extract the message bit sequence 105 from the video stream 103 using correlation techniques in order to distinguish between the encoding pattern 401a used for encoding, for instance, a 0 bit and the encoding pattern 401b used for encoding, for instance, a 1 bit of the original message bit sequence 101. More specifically, for each subframe of size M×N the first and the second correlation value is determined.

As will be appreciated, embodiments disclosed herein may be fine-tuned for embedding the watermark 110 into the most solid portion of the frame content, namely the edges. Unlike smooth surfaces, the edges within video frames are the fundamental pillars which allow recognizing shapes and are mostly preserved. Edges are linked to specific frequencies. In general, an image is made up of high, medium and low frequencies. High frequencies represent the fine details available in an image, medium frequencies can be associated with most of the edges and low frequencies are the slow gradient changes appearing in a picture (a sunset gradient of light). Embodiments disclosed herein focus in particular on medium frequencies for the following two main reasons. Firstly, medium frequencies provide a good compromise between robustness and embeddable space. Although low frequencies are the most robust, they don't allow a satisfying embeddable space. Secondly, medium frequencies provide a good compromise between robustness and imperceptibility. High frequency information pertains to tiny optical details of an image ideal for hiding information. Unfortunately, however, this high frequency information is very vulnerable to generic attacks such as scaling, noise, and the like.

As already described above, embodiments disclosed herein exploit in particular medium frequencies by means of a wavelet transformation implemented by a wavelet kernel filter used, for instance, for a convolution. Unlike a Fourier transformation, wavelet transformations are well suited to extract frequency information localized in time. Although well-established wavelets transformation like DTCWT, CWT, and the like, may be used by the encoding apparatus 110 and the decoding apparatus 160 according to an embodiment as well, these full-scale wavelet transformations are computationally very expensive and, therefore, difficult to implement for real time embedding scenarios. For this reason, embodiments disclosed herein make use of computationally less demanding convolutions using the wavelet kernel filter described above. As already described above, in an embodiment, different convolutions in different directions may be combined in order to extract frequency information at different directions. The result of these convolutions provide the transformation frames which represent frequency information, for instance, along the main horizontal, vertical and diagonal directions. Other sub directions may be added in order to achieve a more accurate frequency representation. Each element of the transformation frames contains information regarding the magnitude of the frequency localized in that point (obtained by its absolute value) and its phase.

As already described above, in an embodiment, the encoding apparatus 110 and the decoding apparatus 160 may use pseudo random patterns of the values +1 and −1 as the encoding matrices 401a,b, wherein the encoding matrices 401a,b have a size M×N and the second encoding matrix 401b may be generated by flipping the sign of the respective element of the first encoding matrix 401a. M and N are parameters that may be adjusted to satisfy different properties such robustness or increasing the embedding space. As already described above, in an embodiment, the distribution of the values of the encoding patterns 401a,b may be chosen in order to achieve different properties. A encoding pattern 401a,b consisting of alternating rows of 1 and −1 may create a decoding invariance along the horizontal direction during the extraction process. This means that even without a perfect alignment on the x axis it is still possible to extract the signal due to this property.

The encoding patterns 401a,b used by the encoding apparatus 110 and the decoding apparatus 160 may improve the performance in the following three ways. Firstly, it is possible to use more sign coefficients to express a bit which increases the redundancy and so the robustness of the scheme. Secondly, the degree of randomness of the encoding patterns 401a,b may increase the imperceptibility as the user may perceive it as random noise. Thirdly, choosing the opposite pattern maximizes the chance to distinguish the first pattern 401a (used for encoding, for instance, a 0 bit) from the second pattern 401b (used for encoding, for instance, a 1 bit) during the decoding process.

FIG. 5 is a flow diagram illustrating an embodiment of a computer-implemented method 500 for embedding, e.g., encoding the message bit sequence 101, e.g., digital watermark 101 in the video stream 103 comprising the plurality of frames 103a-d. The method 500 comprises a step 501 of determining one or more transformation frames of at least one frame of the plurality of frames 103a-d of the video stream 103 based on a wavelet kernel filter. e.g. the wavelet kernel filter described above. Moreover, the method 500 comprises a step 503 of encoding the message bit sequence by performing for each bit of the message bit sequence a pointwise multiplication of absolute values of the elements of subframes of the one or more transformation frames, depending on the value of the respective message bit of the message bit sequence, with the elements of a first encoding matrix 401a or the elements of a second encoding matrix 401b for obtaining one or more modified transformation frames. The method 500 further comprises a step 505 of adding the one or more modified transformation frames to the at least one frame of the plurality of frames 103a-d of the video stream 103 for embedding the message bit sequence 101 in the at least one frame of the plurality of frames 103a-d of the video stream 103.

FIG. 6 is a flow diagram illustrating an embodiment of a computer-implemented data processing method 600 for decoding, e.g., retrieving the message bit sequence 105 from the video stream 103 comprising the plurality of frames 103a-d. The data processing method 600 comprises a step 601 of determining one or more transformation frames of at least one frame of the plurality of frames 103a-d of the video stream 103 based on a wavelet kernel filter, for instance, the wavelet kernel filter described above. Moreover, the method 600 comprises a step 603 of determining a composite transformation frame based on the one or more transformation frames or a sum of the one or more transformation frames. The method 600 further comprises a step 605 of decoding the message bit sequence 105 from the composite transformation frame by determining for one or more subframes of the composite transformation frame a first correlation value with the first encoding matrix 401a described above and a second correlation value with a second encoding matrix 401b described above and by determining the message bit sequence 105 based on the first correlation value and the second correlation value for each of the one or more subframes of the composite transformation frame.

The person skilled in the art will understand that the "blocks" ("units") of the various figures (method and apparatus) represent or describe functionalities of embodiments of the invention (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the invention may be integrated into one processing unit, or each of the units may exist alone physically, or two or more units are integrated into one unit.

What is claimed is:

1. A data processing apparatus for embedding a message bit sequence in a video stream comprising a plurality of frames, the data processing apparatus comprising:
   a processing circuitry configured to modify at least one frame of the plurality of frames of the video stream, wherein the processing circuitry is further configured to:
   determine one or more transformation frames of the at least one frame of the plurality of frames of the video stream based on a wavelet kernel filter;
   encode the message bit sequence by performing for each bit of the message bit sequence a pointwise multiplication of absolute values of elements of subframes of the one or more transformation frames, depending on a value of the respective message bit of the message bit sequence, with elements of a first encoding matrix or elements of a second encoding matrix to obtain one or more modified transformation frames; and
   add the one or more modified transformation frames to the at least one frame of the plurality of frames of the video stream for embedding the message bit sequence in the at least one frame of the plurality of frames of the video stream.

2. The data processing apparatus of claim 1, wherein the processing circuitry is configured to determine the one or more transformation frames of the at least one frame of the plurality of frames of the video stream based on the wavelet kernel filter by performing a convolution of the wavelet kernel filter along one or more directions of the at least one frame of the plurality of frames of the video stream.

3. The data processing apparatus of claim 1, wherein the processing circuitry is configured to determine the one or more transformation frames by a convolution of the wavelet kernel filter along a horizontal direction of the at least one frame, a convolution of the wavelet kernel filter along at least one of a vertical direction of the at least one frame or a convolution of the wavelet kernel filter along a diagonal direction of the at least one frame.

4. The data processing apparatus of claim 1, wherein the video stream comprises a YUV video stream and wherein the at least one frame of the plurality of frames of the YUV video stream is a Y frame.

5. The data processing apparatus of claim 1, wherein the processing circuitry is further configured to:
   downscale the at least one frame of the plurality of frames of the video stream to obtain a downscaled version of the at least one frame of the plurality of frames of the video stream; and
   modify the downscaled version of the at least one frame of the plurality of frames of the video stream.

6. The data processing apparatus of claim 5, wherein the processing circuitry is configured to downscale the at least one frame of the plurality of frames of the video stream to obtain a downscaled version of the at least one frame of the plurality of frames of the video stream by a factor of 2 or more.

7. The data processing apparatus of claim 5, wherein the processing circuitry is further configured to upscale a downscaled version of the one or more modified transformation frames to add the modified transformation frame to the at least one frame of the plurality of frames of the video stream for embedding the message bit sequence in the at least one frame of the plurality of frames of the video stream.

8. The data processing apparatus of claim 1, wherein the elements of the first encoding matrix have the values +1 or −1 and wherein the second encoding matrix is the result of a pointwise multiplication of the elements of the first encoding matrix with −1.

9. The data processing apparatus of claim 8, wherein the processing circuitry is configured to generate at least one of the first encoding matrix or the second encoding matrix based on a random number generator.

10. The data processing apparatus of claim 9, wherein the processing circuitry is configured to generate at least one of the first encoding matrix or the second encoding matrix to have at least one of a desired spatial frequency distribution or a desired degree of orthogonality.

11. The data processing apparatus of claim 1, wherein the processing circuitry is further configured to:

multiply at least some of the elements of the one or more modified transformation frames with a scaling factor smaller than 1, before adding the one or more modified transformation frames to the at least one frame of the plurality of frames of the video stream for embedding the message bit sequence in the at least one frame of the plurality of frames of the video stream.

12. A method for embedding a message bit sequence in a video stream comprising a plurality of frames, the method comprising:

determining one or more transformation frames of at least one frame of the plurality of frames of the video stream based on a wavelet kernel filter;

encoding the message bit sequence by performing for each bit of the message bit sequence a pointwise multiplication of absolute values of elements of sub-frames of the one or more transformation frames, depending on a value of the respective message bit of the message bit sequence, with elements of a first encoding matrix or elements of a second encoding matrix to obtain one or more modified transformation frames; and adding the one or more modified transformation frames to the at least one frame of the plurality of frames of the video stream for embedding the message bit sequence in the at least one frame of the plurality of frames of the video stream.

13. A data processing apparatus for decoding a message bit sequence from a video stream comprising a plurality of frames, wherein the data processing apparatus comprises:

a processing circuitry configured to decode the message bit sequence from at least one frame of the plurality of frames of the video stream, wherein the processing circuitry is further configured to:

determine one or more transformation frames of the at least one frame of the plurality of frames of the video stream based on a wavelet kernel filter;

determine a composite transformation frame based on the one or more transformation frames or a sum of the one or more transformation frames;

decode the message bit sequence from the composite transformation frame by determining for one or more subframes of the composite transformation frame a first correlation value with a first encoding matrix and a second correlation value with a second encoding matrix and determine the message bit sequence based on the first correlation value and the second correlation value for each of the one or more subframes of the composite transformation frame.

14. The data processing apparatus of claim 13, wherein the processing circuitry is configured to determine the one or more transformation frames of the at least one frame of the plurality of frames of the video stream based on the wavelet kernel filter by performing a convolution of the wavelet kernel filter along one or more directions of the at least one frame of the plurality of frames of the video stream.

15. The data processing apparatus of claim 13, wherein the processing circuitry is configured to determine the one or more transformation frames by a convolution of the wavelet kernel filter along a horizontal direction of the at least one frame, a convolution of the wavelet kernel filter along at least one of a vertical direction of the at least one frame or a convolution of the wavelet kernel filter along a diagonal direction of the at least one frame.

16. The data processing apparatus of claim 13, wherein the video stream comprises a YUV video stream and wherein the at least one frame of the plurality of frames of the YUV video stream is a Y frame.

17. The data processing apparatus of claim 13, wherein the elements of the first encoding matrix have the values +1 or −1 and wherein the second encoding matrix is the result of a pointwise multiplication of the elements of the first encoding matrix with −1.

18. The data processing apparatus of claim 17, wherein the processing circuitry is configured to generate at least one of the first encoding matrix or the second encoding matrix or to receive at least one of the first encoding matrix or the second encoding matrix from an apparatus for encoding the message bit sequence in the video stream based on at least one of the first encoding matrix or the second encoding matrix.

19. The data processing apparatus of claim 18, wherein the processing circuitry is configured to generate at least one of the first encoding matrix or the second encoding matrix to have at least one of a desired spatial frequency distribution or a desired degree of orthogonality.

* * * * *